(12) United States Patent
Kawano et al.

(10) Patent No.: US 12,134,422 B2
(45) Date of Patent: Nov. 5, 2024

(54) VEHICLE FRONT BODY STRUCTURE

(71) Applicant: Mazda Motor Corporation, Hiroshima (JP)

(72) Inventors: Akihiro Kawano, Hiroshima (JP); Ippei Kuroda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 337 days.

(21) Appl. No.: 17/714,183

(22) Filed: Apr. 6, 2022

(65) Prior Publication Data

US 2022/0340205 A1 Oct. 27, 2022

(30) Foreign Application Priority Data

Apr. 22, 2021 (JP) ................. 2021-072379

(51) Int. Cl.
*B62D 21/15* (2006.01)
*B62D 25/08* (2006.01)
*B62D 27/00* (2006.01)

(52) U.S. Cl.
CPC ........... *B62D 21/152* (2013.01); *B62D 25/08* (2013.01); *B62D 27/00* (2013.01); *B62D 25/088* (2013.01)

(58) Field of Classification Search
CPC ...... B62D 21/152; B62D 25/08; B62D 27/00; B62D 25/088
USPC ........................................ 296/187.09, 203.02
See application file for complete search history.

(56) References Cited

U.S. PATENT DOCUMENTS 10,486,751 B2 * 11/2019 Nakauchi ............. B62D 25/082

FOREIGN PATENT DOCUMENTS

| JP | 2020-44974 A | | 3/2020 |
|---|---|---|---|
| JP | 2020044974 A | * | 3/2020 |

* cited by examiner

*Primary Examiner* — Amy R Weisberg
*Assistant Examiner* — Dana D Ivey
(74) *Attorney, Agent, or Firm* — XSENSUS LLP (57) ABSTRACT

A vehicle front body structure includes a front side frame extending forward from a dashboard separating a cabin and an engine compartment, an apron reinforcement extending in a front-rear direction, a suspension housing, a braking force booster between this suspension housing and the dashboard, and a coupling member coupled to the front side frame and the apron reinforcement. The coupling member is formed of a material with higher tensile strength than the suspension housing. The coupling member includes a body section fixed to a rear surface of the suspension housing, and a wall section bent from a lower end of this body section and extending rearward.

20 Claims, 11 Drawing Sheets

VEHICLE FRONT BODY STRUCTURE

CROSS-REFERENCE TO RELATED APPLICATIONS

The present application claims priority to Japanese application numbers 2021-072379 filed in the Japanese Patent Office on Apr. 22, 2021, the entire contents of which being incorporated herein by reference.

TECHNICAL FIELD

The present disclosure relates to a vehicle front body structure including: a suspension housing; and a vehicle component arranged between this suspension housing and a dashboard.

BACKGROUND ART

Conventionally, in vehicles such as an automobile, a suspension housing, to which a damper of a front suspension is attached, and which includes a suspension attachment section, is provided in each of right and left areas in an engine compartment formed in a front portion of the vehicle.

Such a suspension housing is arranged across a front side frame and an apron reinforcement extending in a front-rear direction.

A technique of reducing body weight and increasing a degree of freedom for a body shape by using a casting made of an aluminum alloy material for the suspension housing instead of pressing has been proposed.

A vehicle front body structure disclosed in Patent document 1 includes: a body; an aluminum die-cast suspension housing that has a first arm support section provided in front of this body to support a suspension arm, and a second arm support section provided behind the body to support the suspension arm; and a front side frame that has a first fixing section, to which the first arm support section is fixed, and a second fixing section, to which the second arm support section is fixed. These first fixing section and second fixing section are arranged at different positions in a vehicle width direction. In this way, displacement of the suspension housing in the front-rear direction is suppressed.

By the way, the front side frame, which is a body frame member, is configured to be actively deformed plastically in order to absorb impact energy generated by a collision during a frontal collision of the vehicle.

As an impact energy absorption mechanism for the front side frame, two types of impact energy absorption mechanisms exist that are: a folded-type impact energy absorption mechanism that causes the front side frame to be mountain-folded or valley-folded, that is, subjects the front side frame to so-called side-folded deformation; and a compression-type impact energy absorption mechanism that axially compresses and deforms the front side frame in the front-rear direction. When being evaluated by the same deformation stroke length, the axial compressive deformation allows superior impact energy absorption to the side-folded deformation and thus can improve energy absorption efficiency (EA efficiency).

PRIOR ART DOCUMENTS

Patent Documents

[Patent document 1] JP-A-2020-044974

SUMMARY

Problems to be Solved

Even with the front side frame, for which the compression-type impact energy absorption mechanism is adopted, there is a possibility that a cabin, in which an occupant is seated, is deformed during the frontal collision of the vehicle and consequently the occupant comfort is degraded.

Figure 13:
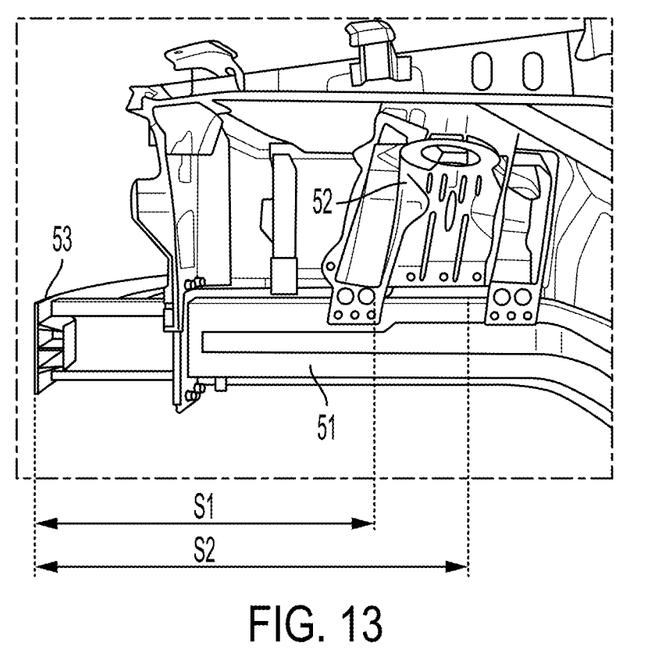
FIG. 13 is a side view of a conventional vehicle front body structure.

As illustrated an FIG. 13, during a full frontal collision of vehicle collisions, the impact energy is transmitted substantially equally to right and left front side frames 51 via a bumper beam 53. Thus, each of the front side frames 51 is subjected to the axial compressive deformation for a specified stroke S1 from a front end thereof to a position corresponding to a front portion of a suspension housing 52. Meanwhile, during an offset frontal collision of the vehicle collisions, the impact energy is concentratedly transmitted to one of the front side frames 51. As a result, the deformation stroke of the corresponding front side frame 51 becomes longer than the stroke S1, and the corresponding front side frame 51 is subjected to the axial compressive deformation for a stroke S2 from the front end thereof to a position corresponding to an intermediate portion or the suspension housing 52.

The aluminum die-cast suspension housing 52 has higher rigidity than a steel suspension housing. Thus, it is estimated that, a rearward movement amount of the aluminum die-cast suspension housing 52 is larger than that of the steel suspension housing during the frontal collision of the vehicle.

Due to the impact energy absorption mechanism, the rearward movement amount of the suspension housing 52, which is provided to the front side frame 51 including the compression-type impact energy absorption mechanism, is larger than that of the suspension housing provided to the front side frame including the folded-type impact energy absorption mechanism.

In addition, in the case where a large-sized vehicle component such as a braking force booster is arranged between the suspension housing 52 and the dashboard, the rearward movement of the suspension housing 52 is transmitted to the dashboard, which defines the cabin, via the vehicle component. As a result, deformation of the dashboard in a cabin inward direction is promoted.

In view of the above, in order to suppress the deformation of the cabin during the frontal collision of the vehicle, rigidity of the dashboard, which defines the cabin, may be increased by increasing a plate thickness of the dashboard.

However, while the rearward movement of the dashboard, to which a collision load is applied via the vehicle component, can be suppressed by increasing the plate thickness of the dashboard, and thus the deformation of the cabin can be suppressed, body weight is possibly increased due to the increased plate thickness of the dashboard.

That is, it is not easy to suppress the deformation of the cabin at the time of the collision load application without increasing the body weight.

Embodiments are directed to providing a vehicle front body structure and the like capable of suppressing deformation of a cabin at the time of collision load application without increasing body weight.

Means for Solving the Problems

A vehicle front body structure according to a first aspect includes: a front side frame that extends forward in a body front-rear direction from a dashboard separating a cabin and an engine compartment; an apron reinforcement that extends in the body front-rear direction at a position on an outer side in a vehicle width direction of and above the front side frame; a suspension housing that is arranged across the front side frame and the apron reinforcement; and a vehicle component that is arranged between the suspension housing and the dashboard. The vehicle front body structure further includes a coupling member that is formed of material having higher tensile strength than the suspension housing and is coupled to the front side frame and the apron reinforcement. The coupling member includes: a body section that is fixed to a rear surface of the suspension housing; and a wall section that is bent from a lower end portion of the body section and extends rearward. The suspension housing may be made of an aluminum alloy casting including a suspension attachment section and the coupling member may be metal.

In this vehicle front body structure, the coupling member is formed of the material having the higher tensile strength than the suspension housing, and is coupled to the front side frame and the apron reinforcement. Thus, even in the case where such a collision load that ruptures the suspension housing to be detached (separated) from the front side frame is applied, the coupling member can be avoided from being detached (separated) from the front side frame.

The coupling member includes: the body section that is fixed to the rear surface of the suspension housing; and the wall section that is bent from the lower end portion of this body section and extends rearward. Accordingly, the wall section, which abuts the rear surface of the suspension housing, can effectively support the collision load. Thus, rearward movement of the suspension housing can be prevented with a simple configuration.

The body section and the wall section may be formed to have a substantially L-shaped cross section via a ridgeline. With this configuration, rigidity of the wall section in the front-rear direction can be increased by using the ridgeline formed in the coupling member.

A first flange section may be provided in a lower portion of the body section to extend rearward and be joined to an upper surface of the front side frame. With this configuration, outward and rearward displacement of the suspension housing may be suppressed.

A second flange section may be provided in an upper portion of the body section to extend rearward and be supported on an inner surface in the vehicle width direction of the apron reinforcement. With this configuration, the second flange section can be pressed against the apron reinforcement by using displacement of the suspension housing, and coupling between the coupling member and the apron reinforcement can thereby be improved.

The body section may have an extending section that is bent from a lower end of the wall section, extends rearward, and is joined to a wheelhouse fixed to the dashboard, and, at an inner end in the vehicle width direction of the extending section, a third flange section is provided to be joined to an outer surface in the vehicle width direction of the front side frame.

With this configuration, the third flange section can be pressed against the front side frame by using the displacement of the suspension housing, and coupling between the coupling member and the front side frame can thereby be improved.

The front side frame may have a compression-type impact energy absorption mechanism that sublets a first area to axial compressive deformation more significantly than a second area, so as to absorb an impact load during a collision, the first area being a front-end portion in the body front-rear direction of the front side frame, and the second area being arranged behind this first area. With this configuration, the front side frame having the compression-type impact energy absorption mechanism can prevent the rearward movement of the suspension housing when being applied with the collision load.

The suspension housing is fixed to the first area of the front side frame, and the coupling member is fixed to the second area of the front side frame. With this configuration, it is possible to reliably prevent the rearward movement of the suspension housing at the time of the collision load application.

Advantages

According to the vehicle front body structure according to embodiments, the wall section that is bent from the lower end of the body section is the coupling member and extends rearward is provided. Therefore, with the simple configuration, it is possible to suppress deformation of the cabin at the time of the collision load application without increasing body weight.

BRIEF DESCRIPTION OF THE DRAWINGS

FIGS. 12A and 12B include views illustrating results of a verification experiment during the offset collision in which

DETAILED DESCRIPTION

A detailed description will hereinafter be made on embodiments with reference to the drawings.

The following description will exemplify application of the embodiments to a vehicle front body structure and thus has no intention to limit the disclosure, application subjects thereof, or application thereof.

First Embodiment

A description will hereinafter be made on a first embodiment with reference to FIG. 1 to FIG. 12B.

As illustrated in FIG. 1 to FIG. 5, a suspension of a double wishbone type is mounted on a vehicle V, and the vehicle V includes a right and left pair of front side frames 10, a right and left pair of apron reinforcements 20, a right and left pair of suspension housings 30, a right and left pair of coupling members 40, and the like. Since the vehicle V is configured to have a bilaterally-symmetrical structure, a description will hereinafter be made primarily on a left portion thereof. In addition, in the drawings, an arrow F direction is set as forward in a body front-rear direction, an arrow L direction is set as leftward in a vehicle width direction, and an arrow U direction is set as upward in a body up-down direction.

First, a description will be made on the overall configuration of the vehicle V.

A dashboard 2 is provided to rise upward from a front end of a floor panel 1 that forms a floor surface of a cabin C. This dashboard 2 is formed to extend in the up-down direction and the right-left direction and separates an engine compartment F formed in a front body portion and the cabin C in the front-rear direct on.

A tub-shaped cowl panel 3 that extends in the vehicle width direction is formed at an upper end of the dashboard 2. A right and left pair of hinge pillars 5 is respectively coupled to right and left ends of the cowl panel 3, and respectively extends upward from front ends of a right and left pair of side sills 4 extending in the front-rear direction.

Figure 2:
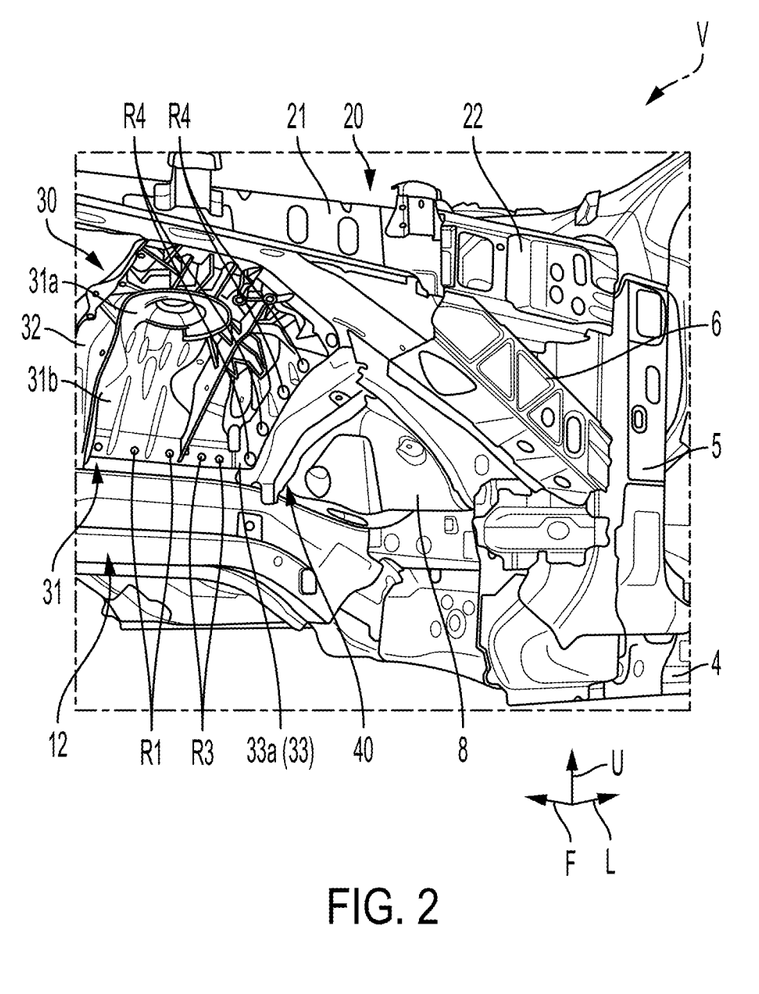
FIG. 2 is a perspective view in which a body portion illustrated in FIG. 1 is seen from below and an outer side in a vehicle width direction.

As illustrated in FIG. 2, a coupling member is provided to couple a middle portion of the hinge pillar 5 and an intermediate portion of the apron reinforcement 20 in a brace-like manner. This coupling member 6 is formed to have a substantially hat-shaped cross section. At a lower end thereof, a flange section is formed to extend downward.

At a position on an inner side in the vehicle width direction of the apron reinforcement 20 and at a position on an inner side in the vehicle width direction of the coupling member 6, a cowl side panel 3a is provided to extend in the body front-rear direction. This cowl side panel 3a defines an outer end in the vehicle width direction of the engine compartment E.

At a position in a front portion of and below the cowl side panel 3a, a wheel house 8 that accommodates a front wheel (not illustrated) is formed. The wheel house 8 is constructed of: an outer wheel house that has a partial bowl shape and is fixed to an outer side in the vehicle width direction of the cowl side panel 3a; and an inner wheel house that has a partial bowl shape and is fixed to an inner side in the vehicle width direction of the cowl side panel 3a.

For example, a rear end of the inner wheel house that is made of a steel sheet having a thickness of 0.6 mm extends rearward and integrally forms a rear apron panel 9. The rear apron panel 9 is coupled to the front side frame 10 and the dashboard 2 via a dash member 2a that extends in the vehicle width direction.

Figure 1:
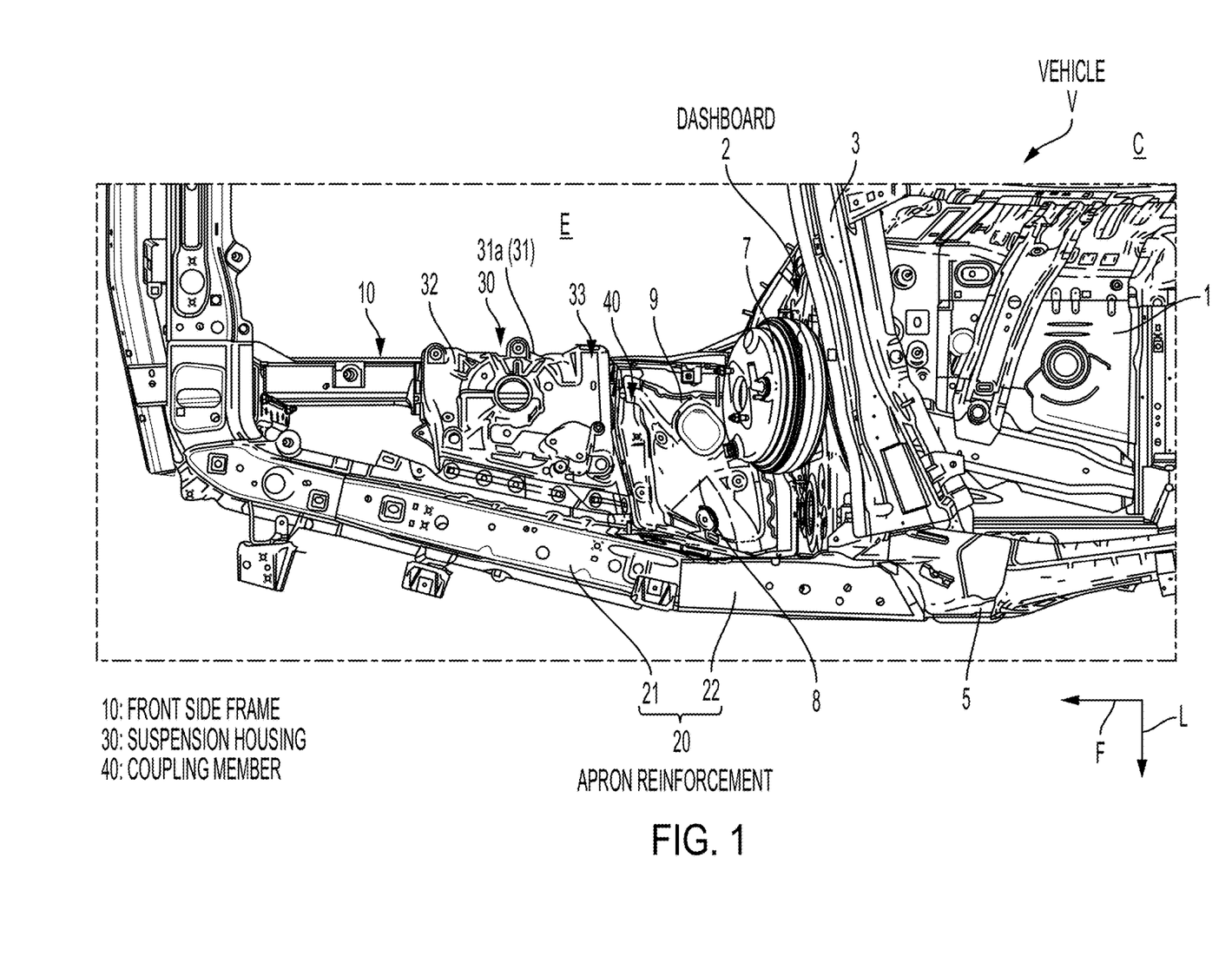
FIG. 1 is a left plan view of a vehicle front body structure according to a first embodiment.
Figure 3:
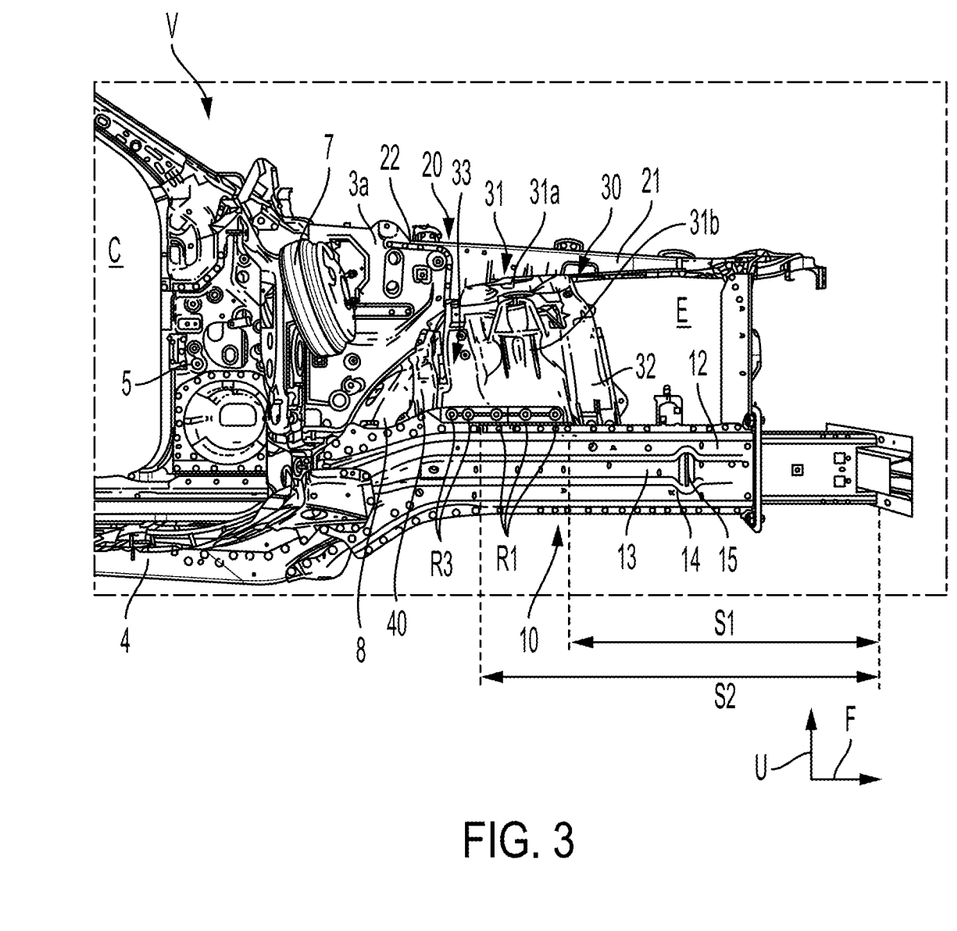
FIG. 3 is a side view in which the body portion illustrated in FIG. 1 is seen from an inner side in the vehicle width direction.

In this vehicle V, a front left seat is a driver's seat. Thus, as illustrated in FIG. 1 and FIG. 3, a braking force booster 7 (a booster) is placed in a left area of the dashboard 2.

At a position near the inner side in the vehicle width direction of the cowl side panel 3a and on an upper side of the rear apron panel 9, the braking force booster 7 has a posture that is inclined upward to the front, and is fixed to the dashboard 2. Thus, as illustrated in FIG. 3, a lower portion of a cylindrical body section of the braking force booster 7 is arranged at a front position from an upper portion thereof.

Next, a description will be made on the front side frame 10.

The front side frame 10 is made of a high-tensile steel sheet, and can absorb impact energy during a frontal collision of the vehicle by using axial compressive deformation of the front side frame 10.

Figure 5:
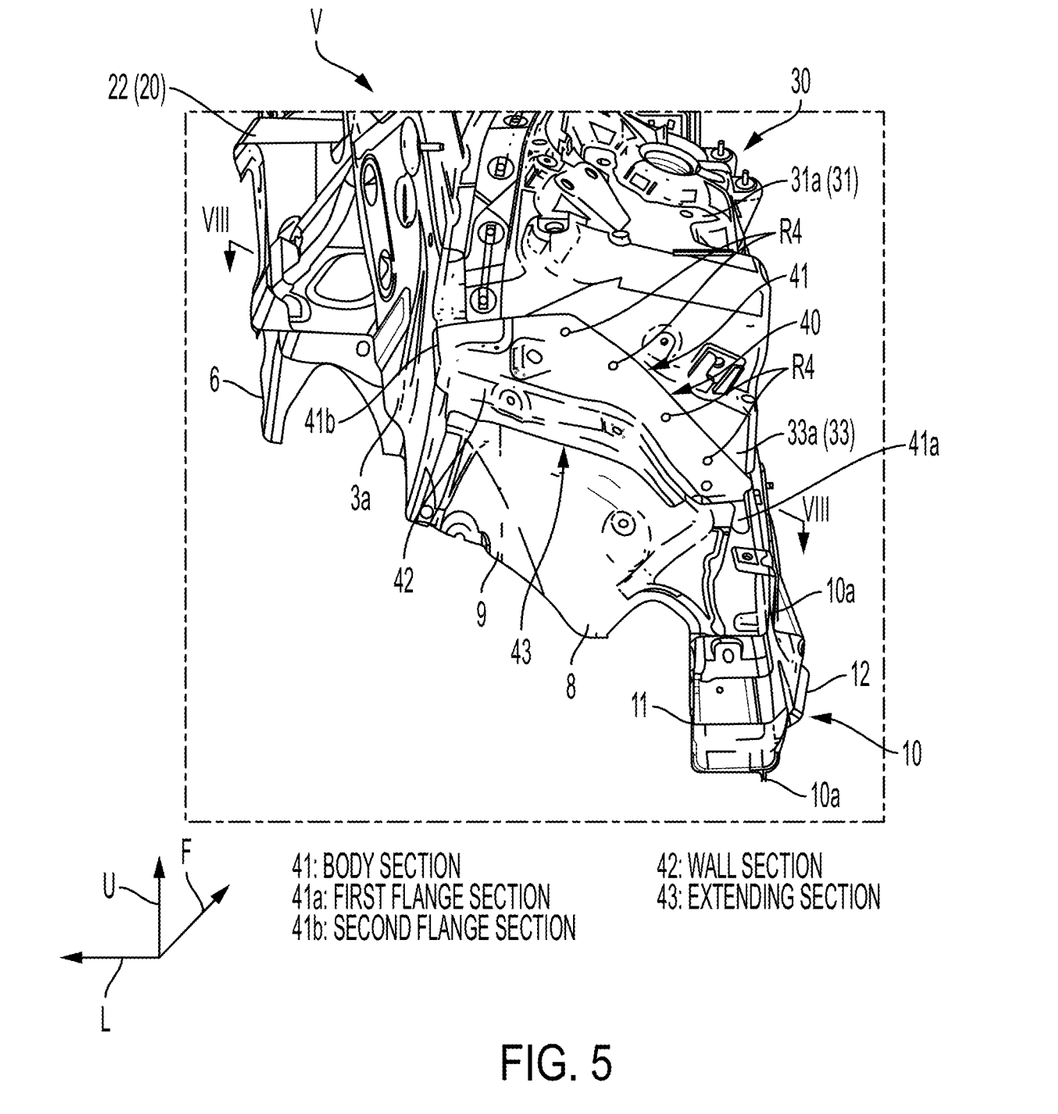
FIG. 5 is a perspective view is which the body portion illustrated in FIG. 1 is seen from above and a rear side.
Figure 6:
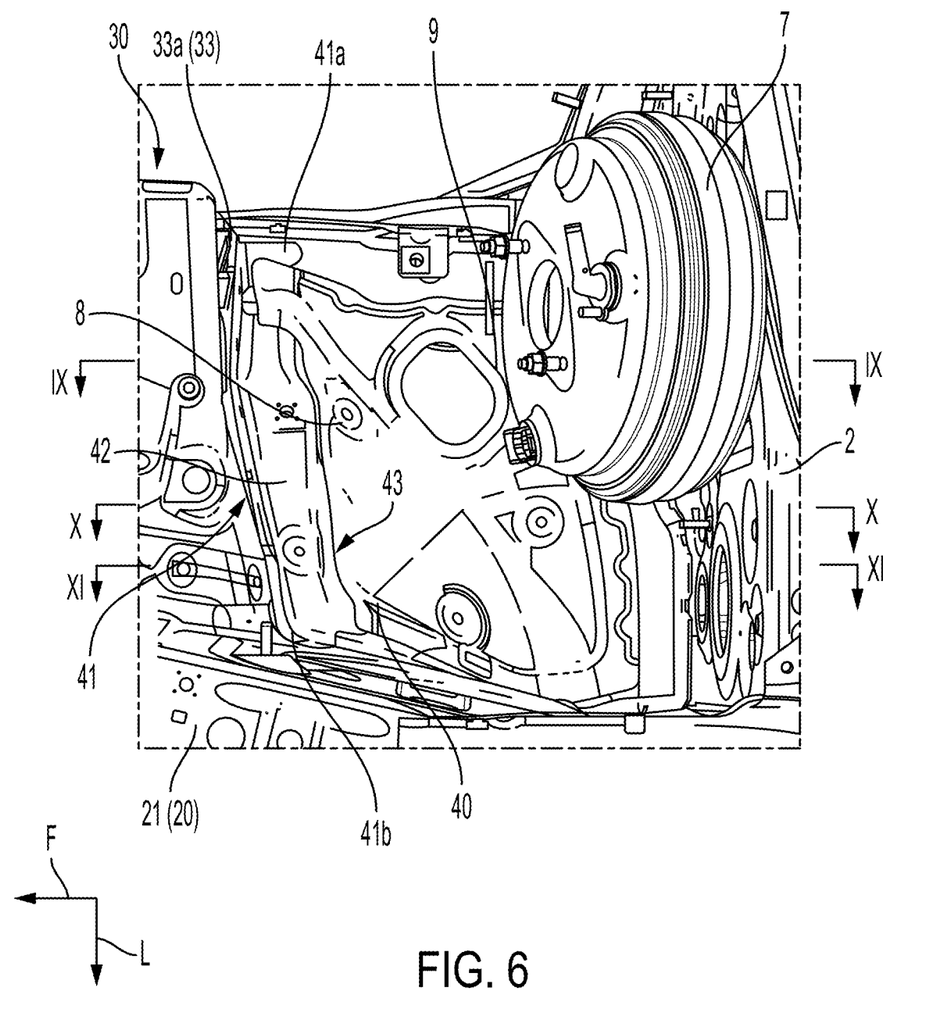
FIG. 6 is an enlarged view of a main section in FIG. 1.
Figure 8:
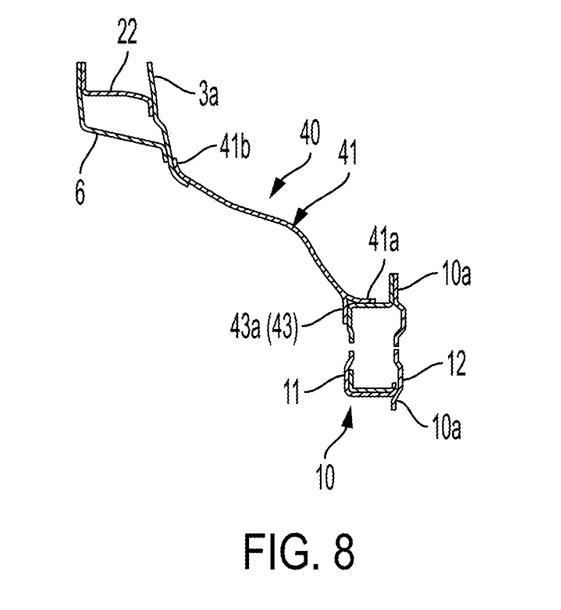
FIG. 8 is a cross-sectional view that is taken along line VIII-VIII in FIG. 5.

As illustrated in FIG. 5 and FIG. 8, the front side frame 10 includes a substantially hat-shaped outer front side frame 11 and a substantially hat-shaped inner front side frame 12. Upper and lower flanges thereof are welded to constitute an upper and lower pair of flanges 10a and a substantially rectangular closed cross section extending in the front-rear direction.

A precondition of a configuration of a compression-type impact energy absorption mechanism that absorbs the impact energy by the axial compressive deformation is that rigidity of a rear portion of the front side frame 10 is higher than rigidity of a front portion thereof. More specifically, in the rear portion of the front side frame 10, a plate-shaped reinforcement member that is orthogonal to the vehicle width direction is interposed between the outer front side frame 11 and the inner front side frame 12.

Figure 4:
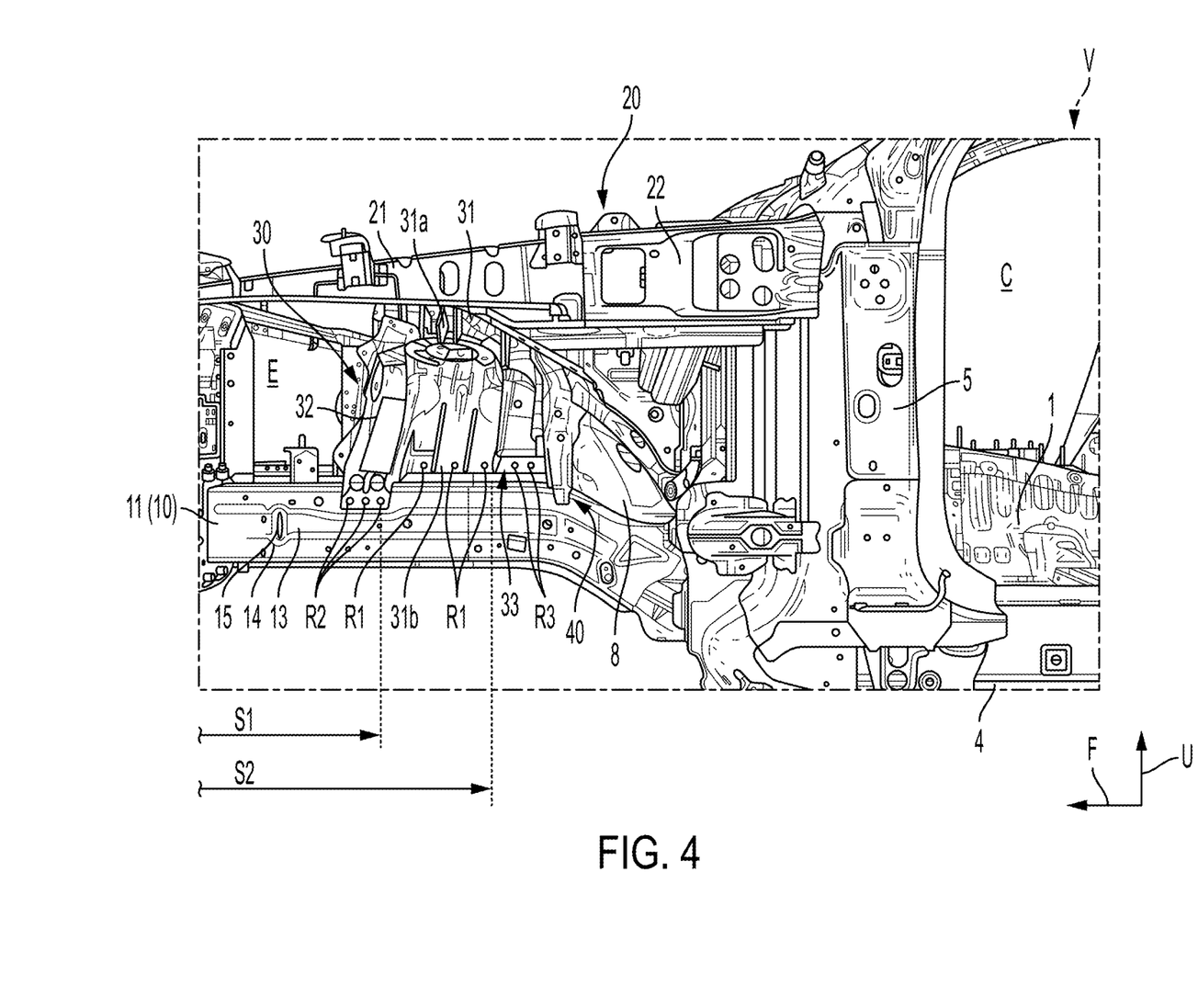
FIG. 4 is a side view of the body portion illustrated in FIG. 1 without a coupling member and a cowl side panel.

As illustrated in FIG. 4, the outer front side frame is formed with front-rear bead 13, a vertical width increased section 14, and an up-down bead 15.

In a middle portion in the up-down direction of the outer front side frame 11, the front-rear bead 13 is formed as a recessed bead that is recessed to the closed cross section side across a front end portion to a rear end portion.

The vertical width increased section 14, in which a vertical width of the front-rear bead 13 is increased in the up-down direction, is provided at a front end position of the front-rear bead 13. In an inner area of the vertical width increased section 14, the up-down bead section 15 is formed to be recessed to the closed cross section side from the front-rear bead section 13.

As illustrated in FIG. 3, similar to the outer front side frame 11, the inner front side frame 12 is formed with the front-rear bead section 13, the vertical width increased section 14, and the up-down bead section 15. As described so far, during the frontal collision of the vehicle, the compression-type impact energy absorption mechanism induces accordion-like compressive deformation of the front side frame 10 with a low-rigid portion (the vertical width increased section 14 and the up-down bead section 15) being an origin of bending. Accordingly, as illustrated in FIG. 3 and FIG. 4, deformation behavior of the front side frame 10 is set in advance such that the front side frame 10 is subjected to axial compressive deformation in a range of a stroke S1 during a full frontal collision of the vehicle collisions and is subjected to the axial compressive deformation in a range of a stroke S2 during an offset frontal collision of the vehicle collisions.

Next, a description will be made on the apron reinforcement 20.

As illustrated FIG. 1 to FIG. 5, the apron reinforcement 20 is arranged at a position on an outer side in the vehicle width direction of the front side frame 10 by a specified distance and above the front side frame 10. This apron reinforcement 20 includes a front apron reinforcement constituting a front half portion and a rear apron reinforcement 22 constituting a rear half portion.

The front apron reinforcement 21 extends in the front-rear direction on an outer side in the vehicle width direction of the suspension housing 30, and the rear apron reinforcement 22 couples the hinge pillar 5 and the front apron reinforcement 21.

The front apron reinforcement 21 is formed to have a substantially L-shaped cross section including: an upper surface that extends in the front-rear direction; and a lateral surface that extends downward from an outer end in the vehicle width direction of this upper surface.

As illustrated in FIG. 5 and FIG. 8, the rear apron reinforcement 22 is formed to have a substantially hat-shaped cross section, and cooperates with the cowl side panel 3a to form a substantially rectangular closed cross section that extends in the front-rear direction.

A coupled portion between the front apron reinforcement 21 and the rear apron reinforcement 22 is partially covered with the coupling member 6. A front end portion of the coupling member 6 is joined to a lower end of the coupled portion between the front apron reinforcement 21 and the rear apron reinforcement 22 by welding.

Next, a description will be made on the suspension housing. The suspension housing may be an aluminum alloy casting formed by aluminum die casting. The aluminum alloy casting allows the suspension housing 30 in a complicated shape that is lightweight and highly rigid. For example, tensile strength of this suspension housing 30 is 210 MPa.

As illustrated FIG. 1 to FIG. 5, the suspension housing 30 partially covers an upper portion of the wheel house 8 and is fixed to the front side frame 10 and the apron reinforcement 20.

This suspension housing 30 integrally includes: a body section 31 in a partially columnar shape; a front support section 32 that has a rectangular parallelepiped shape and is adjacent to a front side of the body section 31; a rear support section 33 that has a rectangular parallelepiped shape and is adjacent to a rear side of the body section 31; plural ribs; and the like.

The body section 31 includes a substantially disc-shaped upper wall section 31a and a substantially cylindrical tower section 31b.

The upper wall section 31a is provided with a damper fixing section, to which an upper end of a damper of the suspension is fixed. The plural radially-arranged ribs are vertically provided on an upper surface of the damper fixing section. This upper wall section 31a is fixed to an upper surface of the front apron reinforcement 21 by plural rivets (not illustrated).

As illustrated in FIG. 3 and FIG. 4, the tower section 31b is formed to extend downward from a radially outer end of the upper wall section 31a. A lower end of the tower section 31b is fixed to an upper flange of the outer front side frame 11 by plural (three, for example) rivets R1.

The front support section 32 is configured to support a front arm section of an upper arm of the suspension. In an upper portion of the front support section 32, a shaft support section is provided to support the front arm section in a freely turntable manner in the up-down direction. As illustrated in FIG. 4, a lower end of the front support section 32 is fixed to a lateral surface of the outer front side frame 11 by plural (three, for example) rivets R2.

The rear support section 33 is configured to support a rear arm section of the upper arm of the suspension. In an upper portion of the rear support section 33, a shaft support section is provided to support the rear arm section in a freely turntable manner in the up-down direction. As illustrated in FIG. 2 and FIG. 5, the rear support section 33 has a rear surface 33a that is substantially orthogonal to the front-rear direction. As illustrated in FIG. 3 and FIG. 4, a lower end of the rear support section 33 is fixed to the upper flange of the outer front side frame 11 by plural (two, for example) rivets R3.

Next, a description will be made on the coupling member 40. As illustrated in FIG. 1 to FIG. 6, the coupling member 40 is disposed between the rear wheel house 8 and the rear support section 33 (the rear surface 33a) that corresponds to a rear end of the suspension housing 30.

The tensile strength of the coupling member 40 is greater than the tensile strength of the suspension housing and may be substantially equivalent to the tensile strength of the wheelhouse 8 (the inner wheelhouse). However, the tensile strength of the coupling member 40 may be set to be higher than the tensile strength of the inner wheelhouse.

The coupling member 40 may be made of a steel sheet. For example, the coupling member 40 may be formed by pressing a single steel sheet having a thickness of 1.8 mm and tensile strength of 440 MPa, for example. The tensile strength of the coupling member 40 may be substantially equivalent to the tensile strength of the wheelhouse 8 (the inner wheelhouse). However, the tensile strength of the coupling member 40 may be set to be higher than the tensile strength of the inner wheelhouse.

Figure 7A:
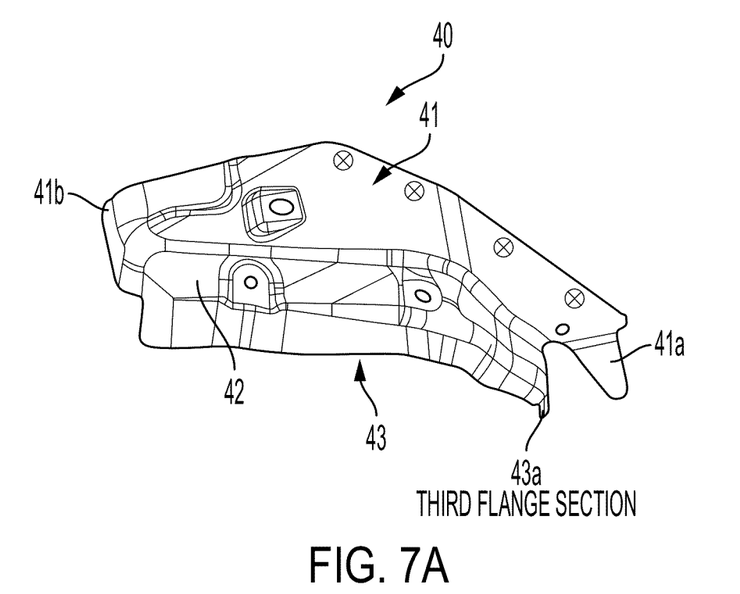
FIG. 7A is a front view illustrating a coupling member.
Figure 7B:
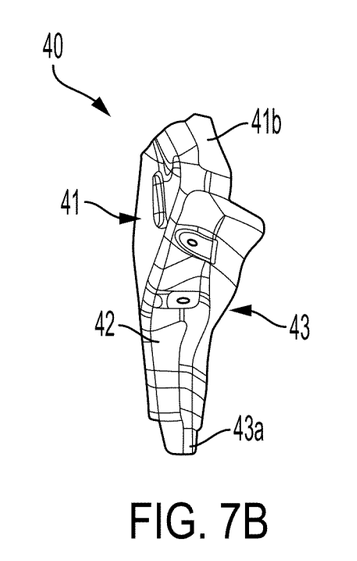
FIG. 7B is a side view of the coupling member of FIG. 7A.

As illustrated in FIG. 7A and FIG. 7B, the coupling member 40 includes: a body section 41 that is subjected to surface abutment with the rear surface 33a of the rear support section 33; a wall section 42 that continues rearward from a lower end of this body section 41; an extending section 43 that continues rearward from a lower end of this wall section 42; and the like.

The body section 41 is arranged to be orthogonal to the front-rear direction. An upper end portion of this body section 41 is fixed to the rear surface 33a by using plural (four, for example) rivets R4 (see FIG. 5).

The body section 41 has a first flange section 41a provided at a lower end and a second flange section 41b provided at an upper end. As illustrated in FIG. 5 and FIG. 8, the first flange section 41a is folded rearward and is joined to an upper surface of the outer front side frame 11, which is orthogonal to the up-down direction, by welding. The second flange section 41b is folded rearward and is joined to an inner surface in the vehicle width direction of the cowl side panel 3a, which is orthogonal to the vehicle width direction, by welding.

Figure 9:
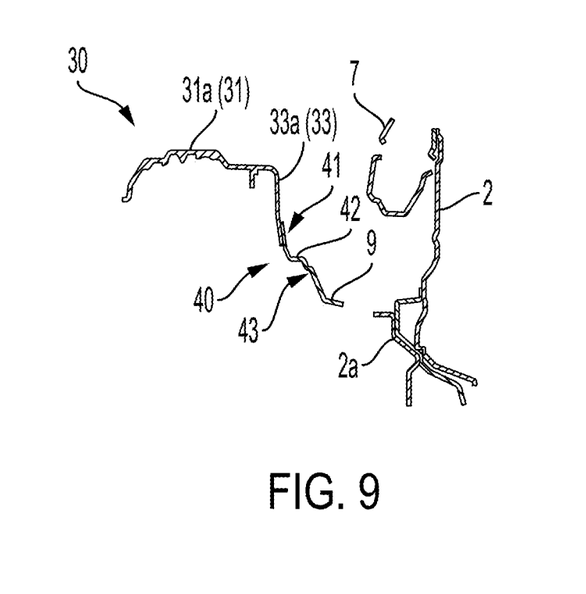
FIG. 9 is a cross-sectional view that is taken along line IX-IX in FIG. 6.
Figure 10:
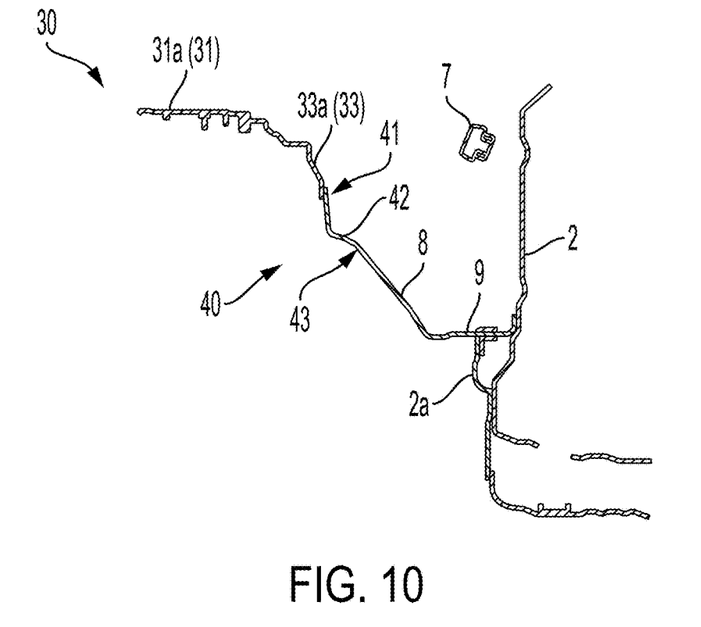
FIG. 10 is a cross-sectional view that is taken along line X-X in FIG. 6.
Figure 11:
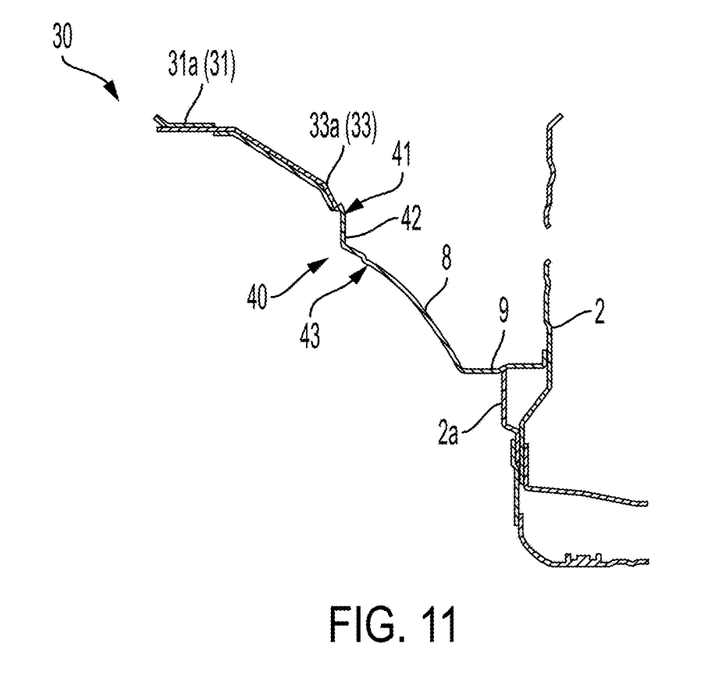
FIG. 11 is a cross-sectional view that is taken along line XI-XI in FIG. 6.

As illustrated in FIG. 9 to FIG. 11, the wall section 42 is bent rearward from the lower end of the body section 41 and defines a ridgeline. The wall section 42 and the body section 41 are substantially L-shaped via the ridgeline.

Since the wall section 42 is arranged adjacent to a rear side of the body section 41 via the ridgeline and to be substantially orthogonal to the up-down direction, the wall section 42 effectively supports a collision load from the front to the rear during the frontal collision of the vehicle.

The extending section 43 is bent downward to the rear from a rear end of the wall section 42 and defines a ridgeline. This extending section 43 has a third flange section 43a in a portion at an inner end in the vehicle width direction and at a lower end.

The third flange section 43a is folded downward and is joined to the lateral surface of the outer front side frame 11, which is orthogonal to the vehicle width direction, by welding. A rear end of the extending section 43 is joined to a rear portion of the wheel house 8 by welding. In this way, the collision load from the front to the rear is distributed from the coupling member 40 to the dash member 2a via the wheel house 8 and the rear apron panel 9.

Next, a description will be made on operational effects of the front body structure of the vehicle V according to the embodiment.

A verification experiment was performed for description of the operational effects.

In this verification experiment, a vehicle model in the same specifications as the vehicle in the first embodiment was prepared. Then, a behavior analysis was made on deformation behavior during the offset collision by computer-aided engineering (CAE).

A description will be made on a verification experiment result with reference to FIG. 12A and FIG. 12B.

Figure 12A:
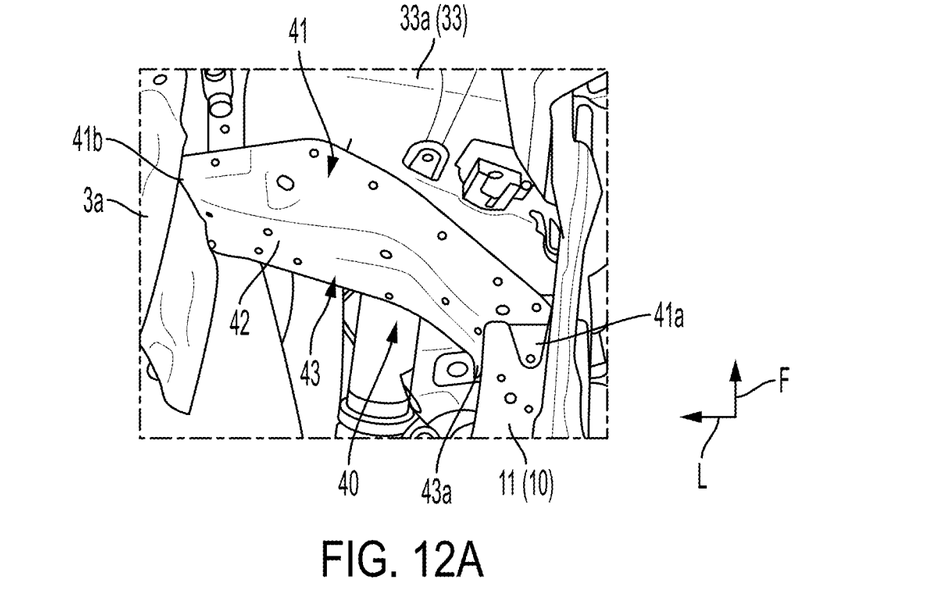
FIG. 12A is a view in an initial period of the collision and FIG. 12B is a view in a late period of the collision.
Figure 12B:
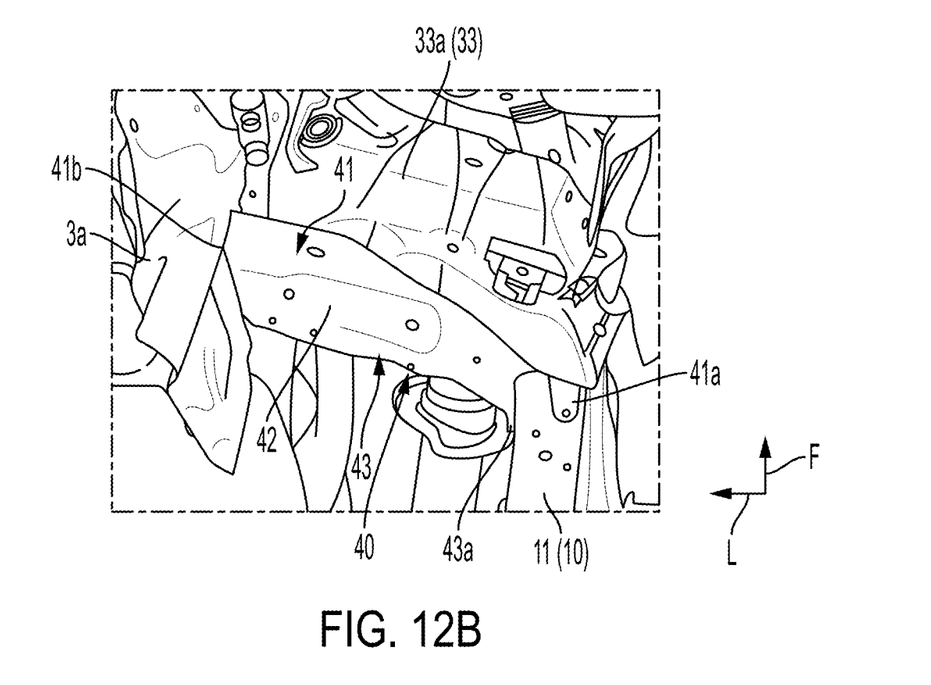

As illustrated in FIG. 12A, it is configured that, in an initial period of the is the first flange section 41a and the second flange section 41b extend rearward, and the second flange section 41b and a third flange section 43a are substantially orthogonal to the vehicle width direction. In this way, when the suspension housing 30 is displaced outward to the rear, the first flange section 41a and the third flange section 43a are pressed by the outer front side frame 11, and the second flange section 41b is pressed by the rear apron reinforcement 22 via the cowl side panel 3a.

Since the first to third flange sections 41a, 41b, 43a are supported by an area where the front side frame 10 is not subjected to the axial compressive deformation (an area behind the stroke and by a portion of the apron reinforcement 20 that corresponds to this area without the axial compressive deformation during the collision of the vehicle, support strength of the coupling member 40 is improved. In this way, as illustrated in FIG. 12B, the outward and rearward displacement of the suspension housing 30 is suppressed in a late period of the collision.

According to this embodiment, the coupling member 40 has a higher tensile strength than the suspension housing 30, and is coupled to the front side frame 10 and the apron reinforcement 20. Thus, even in the case where such a collision load that ruptures the suspension housing 30 to be detached (separated) from the front side frame 10 is applied, the coupling member 40 can be avoided from being detached (separated) from the front side frame 10.

The coupling member 40 includes: the body section 41 that is fixed to the rear surface 33a of the suspension housing 30; and the wall section 42 that is bent from the lower end of this body section 41 and extends rearward. Accordingly, the wall section 42, which abuts the rear surface 33a of the suspension housing 30, can effectively support the collision load. Thus, rearward movement of the suspension housing 30 can be prevented with the simple configuration.

Since the body section 41 and the wall section 42 have the substantially L-shaped cross section via the ridgeline, the front-rear rigidity of the wall section 42 can be increased by using the ridge-line formed in the coupling member 40.

In the lower portion of the body section 41, the first flange section 41a is provided to extend rearward and be joined to the upper surface of the front side frame 10. Thus, the outward and rearward displacement of the suspension housing 30 can be suppressed.

In the upper portion of the body section 41, the second flange section 41b is provided to extend rearward and be supported on the inner surface in the vehicle width direction of the apron reinforcement 20. Thus, the second flange section 41b can be pressed against the apron reinforcement 20 via the cowl side panel 3a by using the displacement of the suspension housing 30, and coupling between the coupling member 40 and the apron reinforcement 20 can thereby be improved.

The body section 41 has the extending section 43 that is bent from the lower end of the wall section 42, extends rearward, and is coupled to the wheel house 8 fixed to the dashboard 2 via the rear apron panel 9. The third flange section 43a is provided at the inner end in the vehicle width direction of the extending section 43, and is joined to the outer surface in the vehicle width direction of the front side frame 10. Thus, the third flange section 43a can be pressed against the front side frame 10 by using the displacement of the suspension housing 30, and coupling between the coupling member 40 and the front side frame 10 can thereby be improved.

The front side frame 10 has the compression-type impact energy absorption mechanism that subjects a first area to the axial compressive deformation more significantly than a second area, so as to absorb an impact load. The first area corresponds to the stroke S2 area as the front end portion of the front side frame 10, and the second area is arranged behind this first area an area behind the stroke S2 area). Thus, the front side frame 10 having the compression-type impact energy absorption mechanism can prevent the rearward movement of the suspension housing 30 even when being applied with the collision load.

The suspension housing 30 is fixed to the first area of the front side frame 10, and the coupling member 40 is fixed to the second area of the front side frame 10. Thus, when the collision load is applied, the rearward movement of the suspension housing 30 can reliably be prevented.

Next, a description will be made on modified embodiments in each of which the above embodiment is partially modified.

1] In the above embodiment, the description has been made on the example in which the braking force booster 7 is disposed between the dashboard 2 and the rear support section 33. However, the vehicle component at least needs to be able to transmit the collision load to the dashboard 2 during the collision, and thus may be an auxiliary battery or the like, for example.

In addition, the description has been made on the example in which the driver's seat is the front left seat. However, embodiments can also be applied to a vehicle in which a front right seat is the driver's seat, and can be applied regardless of a suspension model.

2] In the above embodiment, the description has been made on the example in which the suspension housing 30 and the coupling member 40 are coupled by using the rivets. However, the suspension housing 30 and the coupling member 40 may be coupled by using another mechanical joint method such as bolting, and a suited joint method can be adopted.

3] in addition to the above, those skilled in the art can implement a mode, in which various modifications are added to the embodiment, or a mode, in which the embodiments are combined, without departing from the gist of the present invention, and the present invention includes such modified modes.

DESCRIPTION OF REFERENCE SIGNS AND NUMERALS

2 Dashboard
10 Front side frame
20 Apron reinforcement
30 Suspension housing
40 Coupling member
41 Body section
41a First flange section 41b Second flange section
42 Wall section
43 Extending section
43a Third flange section
V Vehicle

The invention claimed is:

1. A vehicle front body structure comprising:
a front side frame that extends forward in a body front-rear direction from a dashboard separating a cabin and an engine compartment;
an apron reinforcement that extends in the body front-rear direction at a position on an outer side is a vehicle width direction of and above the front side frame;
a suspension housing that is arranged across the front side frame and the apron reinforcement;
a vehicle component between the suspension housing and the dashboard; and
a coupling member having higher tensile strength than the suspension housing and is coupled to the front side frame and the apron reinforcement, wherein
the coupling member includes:
a body section that is fixed to a rear surface of the suspension housing, and
a wall section that is bent from a lower end portion of the body section and extends rearward.

2. The vehicle front body structure according to claim 1, wherein
the body section and the wall section are formed to have a substantially L-shaped cross section via a ridgeline.

3. The vehicle front body structure according to claim 2, wherein
in a lower portion of the body section, a first flange section is provided to extend rearward and be joined to an upper surface of the front side frame.

4. The vehicle front body structure according to claim 3, wherein
in an upper portion of the body section, a second flange section is provided to extend rearward and be supported on an inner surface is the vehicle width direction of the apron reinforcement.

5. The vehicle front body structure according to claim 4, wherein
the body section has an extending section that is bent from a lower end of the wall section, extends rearward, and is joined to a wheel house fixed to the dashboard, and
at an inner end in the vehicle width direction of the extending section, a third flange section is provided to be joined to an outer surface in the vehicle width direction of the front side frame.

6. The vehicle front body structure according to claim 5, wherein
the front side frame has a compression-type impact energy absorption mechanism that subjects a first area to axial compressive deformation more significantly than a second area, so as to absorb an impact load during a collision, the first area being a front-end portion in the body front-rear direction of the front side frame, and the second area being arranged behind this first area.

7. The vehicle front body structure according to claim 6, wherein
the suspension housing is fixed to the first area of the front side frame, and
the coupling member is fixed to the second area of the front side frame.

8. The vehicle front body structure according to claim 2, wherein
in an upper portion of the body section, a second flange section is provided to extend rearward and be supported on an inner surface in the vehicle width direction of the apron reinforcement.

9. The vehicle front body structure according to claim 2, wherein
the body section has an extending section that is bent from a lower end of the wall section, extends rearward, and is joined to a wheelhouse fixed to the dashboard, and
at an inner end in the vehicle width direction of the extending section, a third flange section is provided to be joined to an outer surface in the vehicle width direction of the front side frame.

10. The vehicle front body structure according to claim 2, wherein
the front side frame has a compression-type impact energy absorption mechanism that subjects a first area to axial compressive deformation more significantly than a second area, so as to absorb an impact load during a collision, the first area being a front-end portion in the body front-rear direction of the front side frame, and the second area being arranged behind this first area.

11. The vehicle front body structure according to claim 10, wherein
the suspension housing is fixed to the first area of the front side frame, and
the coupling member is fixed to the second area of the front side frame.

12. The vehicle front body structure according to claim 1, wherein
in a lower portion of the body section, a first flange section is provided to extend rearward and be joined to an upper surface of the front side frame.

13. The vehicle: front body structure according to claim 12, wherein
in an upper portion of the body section, a second flange section is provided to extend rearward and be supported on an inner surface in the vehicle width direction of the apron reinforcement.

14. The vehicle front body structure according to claim 12, wherein
the body section has an extending section that is bent from a lower end of the wall section, extends rearward, and is joined to a wheelhouse fixed to the dashboard, and
at an inner end in the vehicle width direction of the extending section, a third flange section is provided to be joined to an outer surface in the vehicle width direction of the front side frame.

15. The vehicle front body structure according to claim 12, wherein
the front side frame has a compression-type impact energy absorption mechanism that subjects a first area to axial compressive deformation more significantly than a second area, so as to absorb an impact load during a collision, the first area being a front-end portion in the body front-rear direction of the front side frame, and the second area being arranged behind this first area.

16. The vehicle front body structure according to claim 1, wherein
in an upper portion of the body section, a second flange section is provided to extend rearward and be supported on an inner surface in the vehicle width direction of the apron reinforcement.

17. The vehicle front body structure according to claim 1, wherein the body section has an extending section that is bent from a lower end of the wall section, extends rearward, and is joined to a wheel house fixed to the dashboard, and at an inner end in the vehicle width direction of the extending section, a third flange section is provided to be joined to an outer surface in the vehicle width direction of the front side frame.

18. The vehicle front body structure according to claim 1, wherein the front side frame has a compression-type impact energy absorption mechanism that subjects a first area to axial compressive deformation more significantly than second area, so as to absorb an impact load during a collision, the first area being a front-end portion in the body front-rear direction of the front side frame, and the second area being arranged behind this first area.

19. The vehicle front body structure according to claim 18, wherein the suspension housing is fixed to the first area of the front side frame, and the coupling member is fixed to the second area of the front side frame.

20. The vehicle front body structure according to claim 1, wherein the suspension housing is made of an aluminum alloy casting including a suspension attachment section and the coupling member is metal.

* * * * *